(12) United States Patent
Wolff et al.

(10) Patent No.: US 10,354,173 B2
(45) Date of Patent: Jul. 16, 2019

(54) ICON BASED MALWARE DETECTION

(71) Applicant: Cylance Inc., Irvine, CA (US)

(72) Inventors: Matthew Wolff, Laguna Niguel, CA (US); Pedro Silva do Nascimento Neto, Irvine, CA (US); Xuan Zhao, Irvine, CA (US); John Brock, Irvine, CA (US); Jian Luan, Irvine, CA (US)

(73) Assignee: Cylance Inc., Irvine, CA (US)

( * ) Notice: Subject to any disclaimer, the term of this patent is extended or adjusted under 35 U.S.C. 154(b) by 284 days.

(21) Appl. No.: 15/358,009

(22) Filed: Nov. 21, 2016

(65) Prior Publication Data

US 2018/0144130 A1    May 24, 2018

(51) Int. Cl.
*G06K 9/66* (2006.01)
*G06K 9/62* (2006.01)
*G06N 20/00* (2019.01)
*G06F 21/56* (2013.01)
*G06K 9/46* (2006.01)

(52) U.S. Cl.
CPC ............. *G06K 9/66* (2013.01); *G06F 21/563* (2013.01); *G06K 9/6218* (2013.01); *G06K 9/6284* (2013.01); *G06N 20/00* (2019.01); *G06K 9/4647* (2013.01); *G06K 9/4652* (2013.01)

(58) Field of Classification Search
CPC ...... G06K 9/66; G06K 9/4604; G06K 9/4642; G06K 9/4652; G06K 9/6218; G06K 9/6267; G06K 2209/03; G06F 21/563; G06F 3/04817; G06N 99/005
See application file for complete search history.

(56) References Cited

U.S. PATENT DOCUMENTS 6,067,369 A *  5/2000  Kamei ............... G06K 9/00087
                                                382/125
6,711,287 B1 *  3/2004  Iwasaki ............... G06K 9/4652
                                                382/165
(Continued)

FOREIGN PATENT DOCUMENTS

EP            2963577 A1 *  1/2016  ........... G06F 21/567

OTHER PUBLICATIONS

Long et al ("Long," "Detecting Malware Samples with Similar Image Sets," VizSec'14, Nov. 10, 2014, Association of Computing Machinery, pp. 88-95) (Year: 2014).*

(Continued)

*Primary Examiner* — Luu T Pham
*Assistant Examiner* — James J Wilcox
(74) *Attorney, Agent, or Firm* — Jones Day

(57) ABSTRACT

In one respect, there is provided a system for training a neural network adapted for classifying one or more scripts. The system may include at least one processor and at least one memory. The memory may include program code that provides operations when executed by the at least one memory. The operations may include: extracting, from an icon associated with a file, one or more features; assigning, based at least on the one or more features, the icon to one of a plurality of clusters; and generating, based at least on the cluster to which the icon is assigned, a classification for the file associated with the icon. Related methods and articles of manufacture, including computer program products, are also provided.

19 Claims, 7 Drawing Sheets

(56) References Cited

U.S. PATENT DOCUMENTS

| | | | |
|---|---|---|---|
| 8,256,000 B1* | 8/2012 | Krishnappa | G06F 21/564 726/24 |
| 8,364,811 B1* | 1/2013 | Erdmann | G06F 21/552 706/23 |
| 8,561,195 B1* | 10/2013 | Chen | G06F 21/562 726/22 |
| 8,667,593 B1* | 3/2014 | Shnitzer | G06F 21/564 726/22 |
| 8,788,407 B1* | 7/2014 | Singh | G06F 17/30412 705/35 |
| 8,910,284 B1* | 12/2014 | Erdmann | G06F 21/552 706/23 |
| 9,003,314 B2* | 4/2015 | Hinchliffe | G06F 21/50 715/762 |
| 9,197,663 B1* | 11/2015 | Gilbert | G06F 3/04817 |
| 9,672,358 B1* | 6/2017 | Long | G06F 21/565 |
| 9,710,544 B1* | 7/2017 | Smith | G06T 11/206 |
| 9,910,988 B1* | 3/2018 | Vincent | G06F 21/566 |
| 9,998,484 B1* | 6/2018 | Buyukkayhan | H04L 63/1416 |
| 10,230,749 B1* | 3/2019 | Rostami-Hesarsorkh | H04L 63/1425 |
| 2002/0099959 A1* | 7/2002 | Redlich | G06F 21/554 726/23 |
| 2002/0102024 A1* | 8/2002 | Jones | G06K 9/00248 382/225 |
| 2003/0229801 A1* | 12/2003 | Kouznetsov | G06F 21/56 726/22 |
| 2003/0233566 A1* | 12/2003 | Kouznetsov | G06F 21/56 726/22 |
| 2004/0025042 A1* | 2/2004 | Kouznetsov | G06F 21/56 726/22 |
| 2006/0112088 A1* | 5/2006 | Kobayashi | G06F 17/30038 |
| 2011/0047597 A1* | 2/2011 | Mahaffey | G06F 21/564 726/3 |
| 2011/0047620 A1* | 2/2011 | Mahaffey | G06F 21/564 726/23 |
| 2011/0150277 A1* | 6/2011 | Ishii | G06K 9/4652 382/103 |
| 2011/0302655 A1* | 12/2011 | Tikkanen | G06F 21/562 726/24 |
| 2012/0002839 A1* | 1/2012 | Niemela | G06K 9/00973 382/100 |
| 2012/0311708 A1* | 12/2012 | Agarwal | G06F 21/55 726/24 |
| 2012/0311710 A1* | 12/2012 | Butler | G06F 21/51 726/24 |
| 2013/0002699 A1* | 1/2013 | Watanabe | G06T 11/40 345/589 |
| 2013/0086682 A1* | 4/2013 | Mahaffey | G06F 21/564 726/23 |
| 2013/0094711 A1* | 4/2013 | Ishii | G06K 9/4652 382/103 |
| 2014/0075365 A1* | 3/2014 | Xie | G06F 3/04817 715/772 |
| 2014/0150106 A1* | 5/2014 | Butler | G06F 21/51 726/24 |
| 2014/0173735 A1* | 6/2014 | Butler | G06F 21/51 726/24 |
| 2014/0181975 A1* | 6/2014 | Spernow | G06F 21/562 726/23 |
| 2014/0283067 A1* | 9/2014 | Call | H04L 63/1425 726/23 |
| 2015/0262343 A1* | 9/2015 | Lee | G06T 5/006 348/148 |
| 2016/0149943 A1* | 5/2016 | Kaloroumakis | G06N 7/005 726/23 |
| 2016/0224787 A1* | 8/2016 | Guy | G06F 3/04817 |
| 2017/0287178 A1* | 10/2017 | Mankovskii | G06T 11/206 |

OTHER PUBLICATIONS

Kanchera et al "Image Visualization based Malware Detection," 2013 IEEE Symposium on Computational Intelligence in Cyber Security (CICS), pp. 40-44.*

Long et al "Detecting Malware Samples with Similar Image Sets," VizSec'14, Nov. 10, 2014, Paris, France, pp. 88-95.*

* cited by examiner

ICON BASED MALWARE DETECTION

TECHNICAL FIELD

The subject matter described herein relates generally to malware detection and more specifically to detecting malware based on icon images.

RELATED ART

An executable may be a file that is in a format (e.g., machine language) that may be directly executed by a computing system. For instance, a portable executable file (e.g., an .exe file) may include instructions as well as information (e.g., dynamic link library references, application programming interfaces (APIs), and resource management data) required for running the executable and performing the operations indicated by the instructions. Oftentimes, a malware file can masquerade as an outwardly legitimate and/or benign executable. Thus, indiscriminately launching an executable, usually by activating an icon associated with the executable, may introduce undesirable, unintended, and/or harmful behavior into a computing system.

SUMMARY

Systems, methods, and articles of manufacture, including computer program products, are provided for icon based malware detection. In some example embodiments, there is provided a system that includes at least one processor and at least one memory. The at least one memory may include program code that provides operations when executed by the at least one processor. The operations may include: extracting, from an icon associated with a file, one or more features; assigning, based at least on the one or more features, the icon to one of a plurality of clusters; and generating, based at least on the cluster to which the icon is assigned, a classification for the file associated with the icon.

In some variations, one or more features disclosed herein including the following features can optionally be included in any feasible combination. The generating of the classification for the file may be further based at least on a size of the file, one or more strings of characters and/or binary digits included in the file, metadata associated with the file, and/or a type of the file. The icon may include a plurality of pixels, and each of the plurality of pixels may be associated with a pixel value corresponding to a numerical representation of an intensity of the pixel. The extracting of the one or more features may include extracting one or more chromatic features corresponding to a distribution of pixel values for the plurality of pixels included in the icon. The distribution of pixel values may be a mean and/or a standard deviation of pixel values in the icon and/or in one or more portions of the icon. The pixel values may include a separate pixel value for different color components of the plurality of pixels.

In some variations, the extracting of the one or more features may include extracting one or more gradient features corresponding to a gradient and/or edge orientation of the plurality of pixels in the icon. The gradient and/or edge orientation of the plurality of pixels may correspond to a direction of change in pixel values. The one or more gradient features may be extracted by at least generating one or more histograms of oriented gradients for the icon and/or one or more portions of the icon.

In some variations, the extracting of the one or more features may include extracting one or more condensed features. The one or more condensed features may be one or more features required to generate a reconstruction of the icon that is representative of the icon. The one or more condensed features may be extracted by at least processing the icon with a machine learning model. The machine learning model may be an autoencoder trained to identify, based at least on a respective pixel value of the plurality of pixels, the one or more features required to generate the reconstruction of the icon. A quantity of condensed features extracted from the icon is less than a total quantity of features present in the icon.

In some variations, the plurality of clusters may include a first cluster and a second cluster. The first cluster includes icons of one or more files that are known to be benign files and the second cluster may include icons of one or more files that are known to be malware files. Alternately and/or additionally, the first cluster may include icons of one or more files that are known to be a first type of malware file and the second cluster may include icons of one or more files that are known to be a second type of malware file.

In some variations, the plurality of clusters may group icons of one or more files having known classifications. The plurality of clusters may be generated based at least on one or more features of the icons of the one or more files having known classifications. The plurality of clusters may be generated by at least applying a density-based clustering technique. The applying of the density-based clustering technique may group icons having same and/or similar features. The applying of the density-based clustering technique may further identify at least one outlier that is not grouped with any cluster from the plurality of clusters. The at least one outlier may correspond to an icon having features that renders the icon dissimilar to the icons that are grouped together into the plurality of clusters. The assigning of the icon to the one of the plurality of clusters may include: applying a first clustering technique to assign the icon to the one of the plurality of clusters; and applying a second clustering technique to assign the icon to the one of the plurality of clusters, when applying the first clustering technique indicates that the icon is an outlier. The first clustering technique may be k-nearest neighbor clustering and the second clustering technique may be k-means clustering technique. Alternately and/or additionally, the first clustering technique and/or the second clustering technique may be a classifier that is trained to determine the one of the plurality of clusters to which the icon would be assigned by applying the density-based clustering technique.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
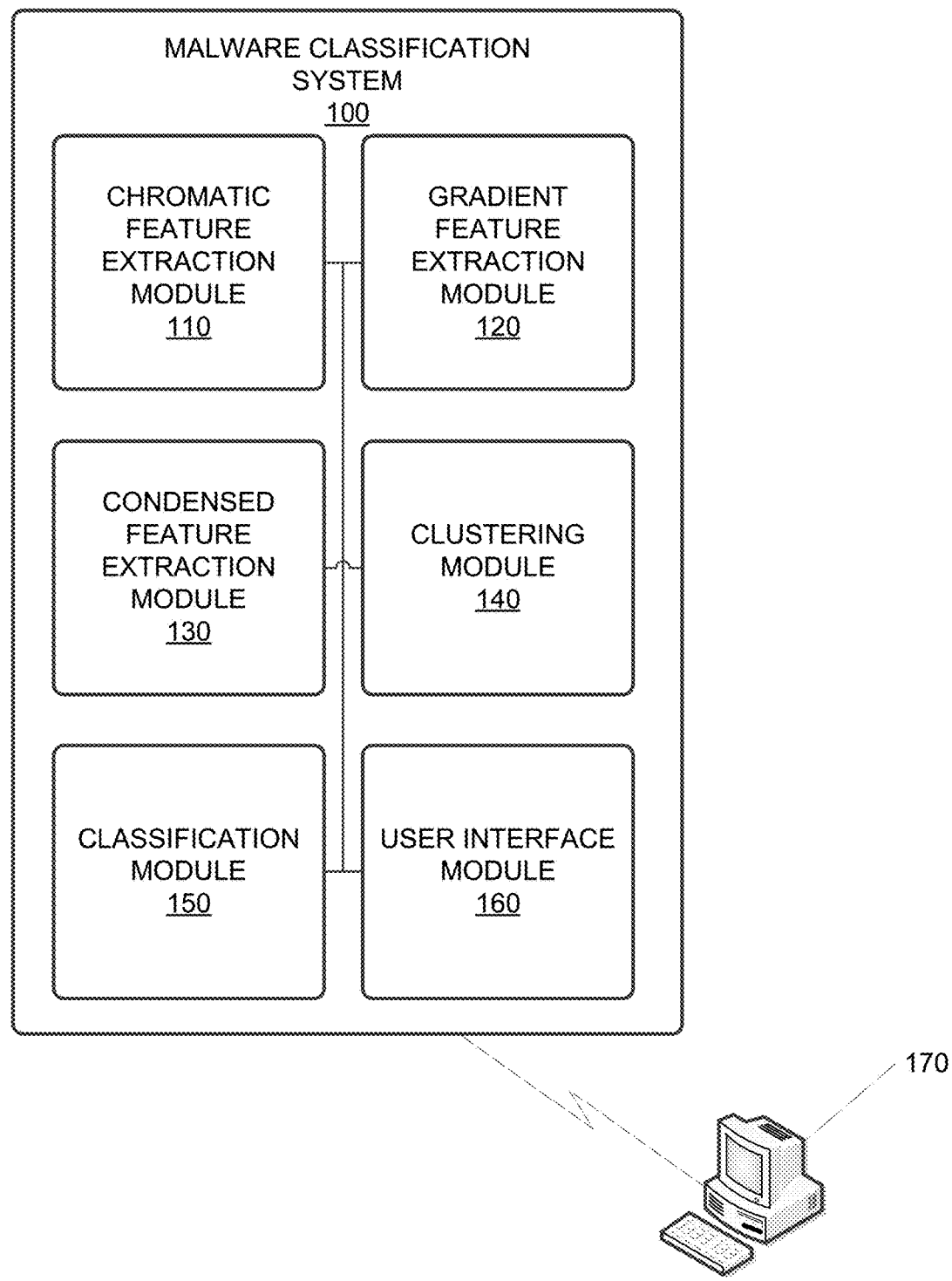
FIG. 1 depicts a block diagram illustrating a malware detection system, in accordance with some example embodiments.

Like labels are used whenever possible to refer to same or similar items in the drawings.

DETAILED DESCRIPTION

A file, such as an executable and/or the like, is typically associated with an icon symbolizing the file. For example, the icon may be an image composed of a grid of pixels, which may be points rendered in greyscale and/or color (e.g., red, green, and blue). As noted above, activating an icon (e.g., via mouse, keyboard, haptic, and/or voice commands) may launch a corresponding file. In addition, the icon associated with a file may also provide information (e.g., visual features such as shapes, color, and/or the like) useable to identify and/or distinguish the file. For instance, an icon associated with a malware file may exhibit one or more distinguishing characteristics that are not present in icons for legitimate and/or benign files. However, these distinguishing characteristics may be deliberately nuanced and thus indiscernible to the human eye. Furthermore, icons associated with malware files tend to include visual anomalies, such as blurriness, color shifts, and/or the like, that defy conventional image recognition techniques.

In some example embodiments, a malware detection system may be configured to determine, based at least on an icon associated with a file, whether the file is a malware file. The malware detection system may be configured to extract, from the icon, one or more features adapted to overcome any visual anomalies included in the icon (e.g., blurriness, color shifts, and/or the like). For example, the malware detection system may extract, from the icon, chromatic features, gradient features, and/or condensed features. According to some example embodiments, the malware detection system may determine, based on the chromatic features, gradient features, and/or condensed features associated with an icon, whether a corresponding file is a malware file. In particular, the malware detection system may determine whether the file is a malware file by at least determining, based on the features (e.g., chromatic, gradient, and/or condensed features) of the icon associated with the file, a nexus between that icon and icons of other files having known classifications. For instance, icons of files having known classifications may be clustered in a manner that groups together icons according to the classification of the corresponding files. Thus, the malware detection system may classify a file by at least assigning, via a machine learning model, the icon associated with the file to one of the plurality of clusters. The cluster to which the file is assigned may be one of a plurality of features associated with the file that may enable the malware detection system to classify the file.

In some example embodiments, the malware detection system may classify a file based on the icon associated with the file as well as one or more additional features associated with the file. Other features that may be used in classifying the file may include, for example, a size of the file, one or more strings (e.g., of characters and/or binary digits) included in the file, metadata associated with the file, a type of the file, and/or the like. For example, the malware detection system may classify a file based on an icon associated with the file and discrepancies between a type of the file (e.g., a portable document file (PDF)) and a file type indicated by the icon associated with the file (e.g., a Word document icon), as well as other features related to the file.

In some example embodiments, the malware classification system may be configured to generate a plurality of clusters grouping together icons associated with various files including, for example, files having known classifications. For example, the malware classification system may generate clusters of icons associated with files that are known to be benign files and/or malware files. Alternately and/or additionally, the malware classification system may generate clusters of icons associated with files that are known to be specific types of malware files such as adware, ransomware, bots, bugs, rootkits, spyware, Trojan horses, viruses, worms, and/or the like. The malware classification system may cluster the icons by at least applying one or more clustering techniques including, for example, density-based clustering (e.g., density-based spatial clustering of applications with noise (DBSCAN), hierarchical density-based spatial clustering of applications with noise (HDBSCAN)) and centroid-based clustering (e.g., k-nearest neighbor clustering, k-means clustering). The icons may be clustered based on the features (e.g., chromatic, gradient, and condensed features) associated with each icon. In doing so, the malware classification system may generate clusters that group same and/or similar icons, which may be associated with files having the same and/or similar classification.

FIG. 1 depicts a block diagram illustrating a malware classification system 100, in accordance with some example embodiments. Referring to FIG. 1, the malware classification system 100 may include a plurality of modules including, for example, a chromatic feature extraction module 110, a gradient feature extraction module 120, a condensed feature extraction module 130, a clustering module 140, a classification module 150, and a user interface module 160. It should be appreciated that the malware classification system 100 may include different and/or additional modules than shown without departing from the scope of the present disclosure.

As shown in FIG. 1, the malware classification system 100 can communicate with a client device 170. The malware classification system 100 may be configured to provide one or more functionalities including, for example, icon based classification of files encountered at the client device 170. According to some example embodiments, the functionalities of the malware classification system 100 may be accessed over a remote (e.g., cloud) platform and/or an endpoint agent (e.g., at the client device 170). For instance, the malware classification system 100 can communicate with the client device 170 via a wired and/or wireless network including, for example, a local area network (LAN), a wide area network (WAN), and the Internet. Alternately and/or additionally, the malware classification system 100 may be deployed at the client device 170 as computer software and/or dedicated circuitry (e.g., application specific integrated circuits (ASICs)).

The malware classification system 100 may be configured to extract, from an icon associated with a file, one or more features (e.g., chromatic, gradient, and condensed features) adapted to overcome any visual anomalies included in the icon such as blurriness, color shifts, and/or the like. According to some example embodiments, the malware classification system 100 may be configured to extract a same number of features from each icon. For instance, the malware classification system 100 may extract, from each icon, an x number of chromatic features, a y number of gradient features, and/or z number of condensed features. As one example, the malware classification system 100 may extract, from different icons, a total of 1114 features including, for example, 26 chromatic features, 576 gradient features, and 512 condensed features. The malware classification system 100 may then classify, based on the 1114 features extracted from each icon, the file that is associated with the icon. In some example embodiments, the malware classification system 100 may apply one or more dimensionality reduction techniques to reduce the dimensionality of various icons. For instance, the malware classification system 100 may apply a dimensionality reduction technique such as random projection, robust principal component analysis (RPCA), t-distributed stochastic neighbor embedding (t-SNE), and/or the like. Applying the dimensionality reduction technique may reduce the dimensionality of the icons from a high-dimensionality feature space (e.g., 1114) to a lower-dimensionality features space (e.g., 100), thereby facilitating a subsequent assignment of an icon to one or more clusters of icons having known classifications.

In some example embodiments, the chromatic feature extraction module 110 may be configured to extract, from an icon, chromatic features that capture at least a portion of the color information included in the icon. According to some example embodiments, the chromatic feature extraction module 110 may be configured to extract, from an icon, the x number of chromatic features (e.g., $c_1, c_2, \ldots, c_x$) that correspond to a distribution (e.g., mean, standard deviation) of pixel values in the icon as a whole and/or in individual portions of the icon. For instance, the chromatic feature extraction module 110 may extract 26 chromatic features from an icon. Here, a pixel value may be a numerical representation (e.g., an 8-bit integer between 0 and 255) of the intensity of a corresponding pixel in the icon. For an icon that is a greyscale image, pixel values may range from zero for black and 255 for white. By contrast, the pixel values for an icon that is a color image may be vectors that include a separate value (e.g., 8-bit integer between 0-255) for each color component (e.g., red, green, blue).

Figure 2A:
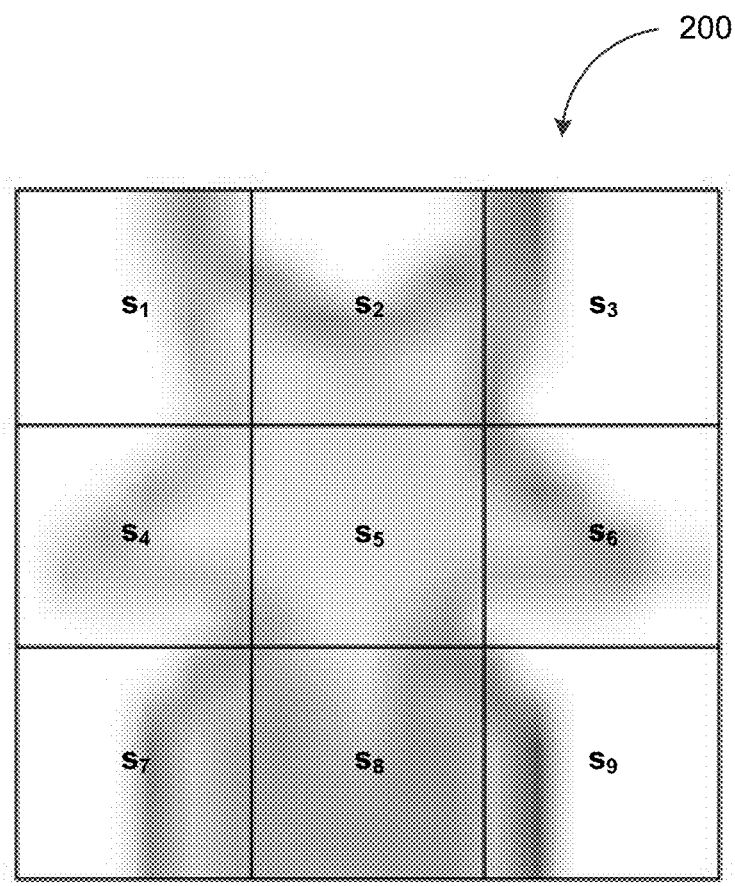
FIG. 2A depicts the chromatic features of an icon, in accordance with some example embodiments.

FIG. 2A depicts the chromatic features of an icon 200, in accordance with some example embodiments. Referring to FIGS. 1 and 2A, the chromatic feature extraction module 110 may extract, from the icon 200, an x number of chromatic features that correspond to a distribution (e.g., mean, standard deviation) of pixel values in the icon 200 as a whole and/or in individual portions of the icon 200. For instance, the chromatic feature extraction module 110 may extract chromatic features that include a mean of all the pixel values in the icon 200 and a standard deviation of all the pixel values in the icon 200. The chromatic feature extraction module 100 may further extract chromatic features that include the mean and standard deviation of the individual color components (e.g., red, green, blue) of the icon 200 as a whole. Alternately and/or additionally, the icon 200 may be divided into a plurality of sections. As shown in FIG. 2A, the icon 200 may be divided into nine sections (e.g., $s_1, s_2, \ldots, s_9$). In some example embodiments, the chromatic feature extraction module 100 may extract chromatic features that include the mean and standard deviation of the pixel values found in each of the nine sections $S_1, s_2, \ldots, s_9$.

It should be appreciated that the icon 200 may be divided into a different number of sections than shown without departing from the scope of the present disclosure. As such, the chromatic feature extraction module 110 may extract, from the icon 200, any number of chromatic features without departing from the scope of the present disclosure. Moreover, it should be appreciated that any technique for determining and/or representing the distribution of pixel values (e.g., across the icon 200 as a whole and/or in portions of the icon 200) may be used in the extraction of chromatic features. For example, one or more different techniques (e.g., mode, median) may be used instead of and/or in addition to mean and standard deviation without departing from the scope of the present disclosure.

In some example embodiments, the gradient feature extraction module 120 may be configured to extract, from an icon, a y number of gradient features (e.g., $g_1, g_2, \ldots, g_y$) corresponding to the gradient and/or edge orientation for the pixels in the icon. For instance, the gradient feature extraction module 120 may extract 576 gradient features from an icon. The gradient features extracted by the gradient feature extraction module 120 may capture at least a portion the shape and/or textural information included in an icon. Furthermore, gradient features extracted by the gradient feature extraction module 120 may further enable a detection of objects present in the icon. According to some example embodiments, the gradient feature extraction module 120 may extract gradient features from an icon by at least generating one or more histograms of oriented gradients (HOG) for the icon. However, it should be appreciated that a different technique, such as edge orientation histograms, scale-invariant feature transform, shape context, and/or the like, may be used without departing from the scope of the present disclosure.

Figure 2B:
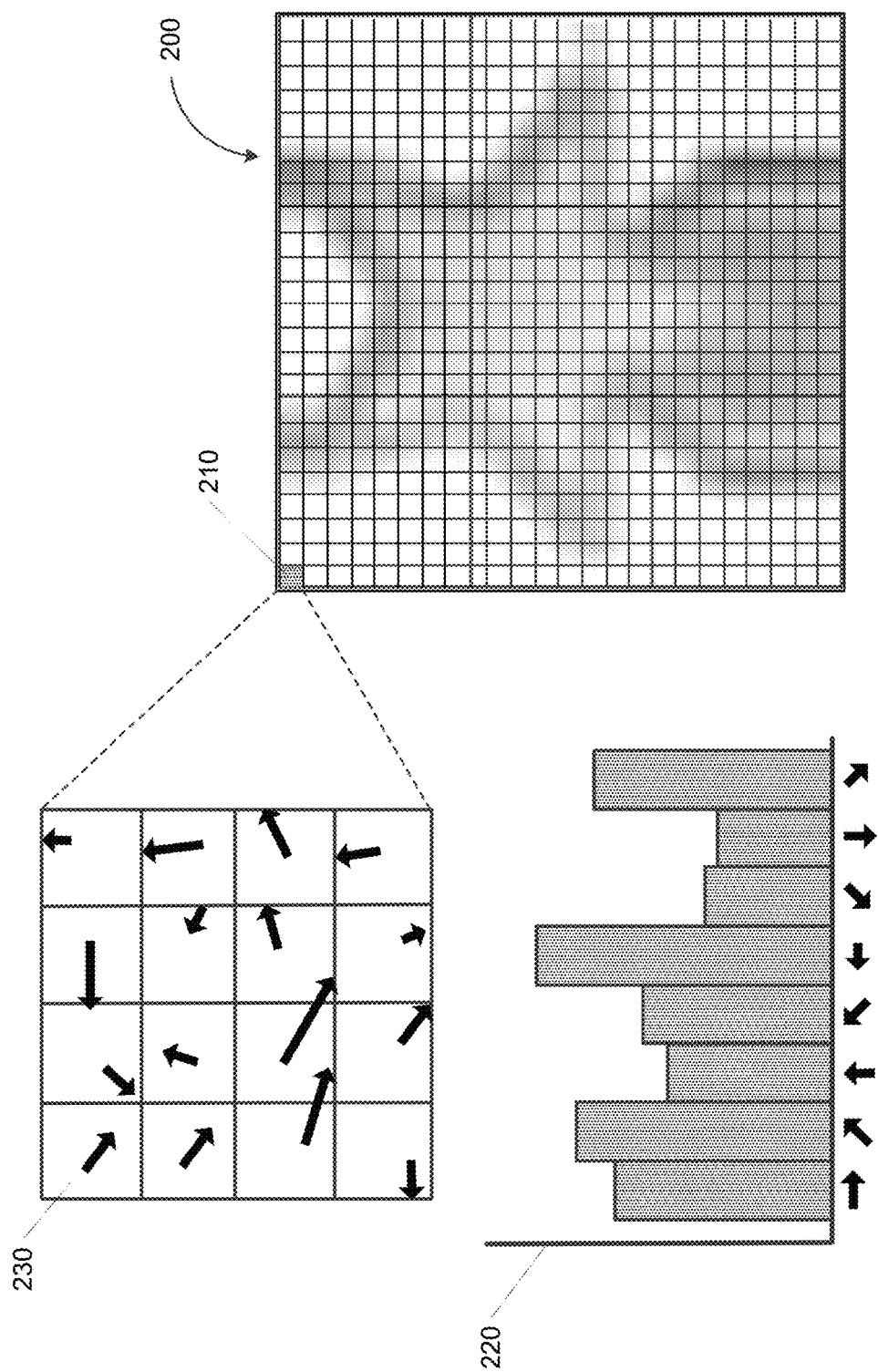
FIG. 2B depicts the gradient features of an icon, in accordance with some example embodiments.

FIG. 2B depicts the gradient features of the icon 200, in accordance with some example embodiments. Referring to FIG. 2B, the icon 200 may be divided into a plurality of regions called cells. In some example embodiments, the gradient feature extraction module 120 may resize an icon such as the icon 200 in order to be able to divide every icon into a same number of cells and extract a same number of gradient features from each icon. The gradient feature extraction module 120 may extract a gradient feature for each of the plurality of cells by at least generating a histogram of oriented gradients for each cell. For example, the gradient feature extraction module 120 may generate, for a cell 210, a corresponding histogram of oriented gradients 220 that includes the gradient and/or edge orientations of each of the pixels in the cell 210. The histogram of oriented gradients 220 may be one of a plurality of gradient features for the icon 200. As shown in FIG. 2B, the cell 210 may include a plurality of pixels. The gradient feature extraction module 120 may determine, for each of the plurality of pixels in the cell 210, a respective gradient and/or edge orientation indicative of a direction of increase in pixel values. For instance, the gradient and/or edge orientation of a pixel 230 may point towards adjacent pixels having greater pixel values than the pixel 230. Moreover, the gradient and/or edge orientation of the pixel 230 may be weighted based on a magnitude of difference in pixel values between the pixel 230 and the adjacent pixels.

In some example embodiments, the condensed feature extraction module 130 may be configured to extract, from an icon, a z number of condensed features (e.g., $f_1, f_2, \ldots, f_z$). Suppose that the icon originally includes a n number of features, the z number of condensed features may be subset of that n number of features. According to some example embodiments, the z number of condensed features may form a compressed version of the icon. Thus, the z number of condensed features may correspond to prominent and/or significant features from the icon. These z number of condensed features may form the compressed version of the icon, thereby providing a representation of the icon that requires fewer than the original n number of features in the icon.

For instance, the condensed feature extraction module 130 may extract a subset of 512 condensed features from an icon that includes more than 512 features. The condensed feature extraction module 130 may apply a machine learning model that may be trained to identify the subset of features from the icon. For example, the condensed feature extraction module 130 may process the icon 200 with an autoencoder, which may be trained to generate a compressed version of the icon 200 by at least identifying a subset of features from the icon 200. The subset of features (e.g., prominent and/or significant features) from the icon 200 may form a compressed version of the icon 200. This compressed version of the icon 200 may provide a representation of the icon 200 using a fewer number of features. However, it should be appreciated that other techniques may be used to extract a subset of features from an icon without departing from the scope of the present disclosure.

Figure 2C:
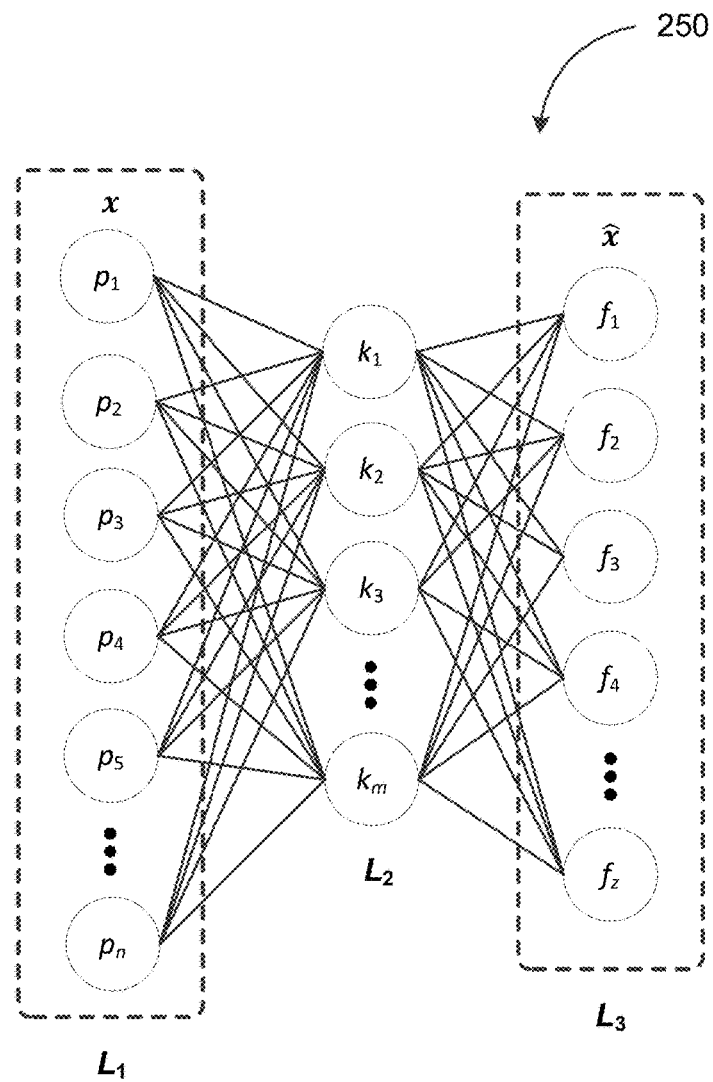
FIG. 2C depicts an autoencoder, in accordance with some example embodiments.

FIG. 2C depicts an autoencoder 250, in accordance with some example embodiments. Referring to FIG. 2C, the autoencoder 250 may be a neural network having a plurality of layers including, for example, a first layer $L_1$, a second layer $L_2$, and a third layer $L_3$. Although the autoencoder 250 is shown to include three layers, it should be appreciated that the autoencoder 250 may include a different number of layers without departing from the scope of the present disclosure.

In some example embodiments, the first layer $L_1$ may be an input layer configured to receive an input x. The input x may be the icon 200, which may include n number of features (e.g., $p_1, p_2, \ldots p_n$). Referring to FIG. 2B, the n number of features may correspond to the individual pixels, such as the pixel 230, appearing in the icon 200. Meanwhile, the second layer $L_2$ may be a hidden layer configured to identify a subset of features from the icon 200. According to some example embodiments, an m number of filters called kernels (e.g., $k_1, k_2, \ldots, k_m$) may be applied at the second layer $L_2$. These kernels may be adapted to identify, from the icon 200, a subset of features (e.g., the z number of condensed features) that may be used to generate a compressed version of the icon 200. For instance, the kernels may select pixels having the maximum pixel value amongst a group of adjacent kernels. Alternately and/or additionally, the kernels may determine an average pixel value amongst a group of adjacent kernels. In doing so, autoencoder 250 may generate a compressed version of the icon 200 that provide a representation of the icon 200 but using fewer than the original n number of features.

As shown in FIG. 2C, the compressed version of the icon 200 may be output at the third layer $L_3$, which may serve as the output layer of the autoencoder 250. Applying the m number of kernels at the second layer $L_2$ may generate, as an output $\hat{x}$, a compressed version of the icon 200. That is, the output $\hat{x}$ may provide a representation of the icon 200 that is original input x. However, instead having n number of pixels (e.g., $p_1, p_2, \ldots p_n$) as in the icon 200, the output $\hat{x}$ may represent the icon 200 with a fewer number of features. Thus, the output $\hat{x}$ may represent the icon 200 with the z number of condensed features (e.g., $f_1, f_2, \ldots, f_z$) instead of the n number of pixels (e.g., $p_1, p_2, \ldots p_n$) in the icon 200.

According to some example embodiments, the autoencoder 250 may be trained, via machine learning (e.g., supervised and/or unsupervised learning) and optimization techniques (e.g., backpropagation of errors), to learn the following function (1), which may be an identity function that generates a compressed representation of the icon 200.

$$h_{W,b}(x) \approx \hat{x} \qquad (1)$$

wherein the autoencoder 250 may apply the identity function h by at least applying the weights W and the biases b during the processing of the input x (e.g., the icon 200). The weights W and/or the biases b may be adjusted during the training of the autoencoder 250. Applying the identity function h to the input x may generate the output $\hat{x}$ that is similar to the input x. Specifically, the output $\hat{x}$ may be the z number of condensed features (e.g., $f_1, f_2, \ldots, f_z$), which may be a subset of then number of pixels (e.g., $p_1, p_2, \ldots p_n$) found in the input.

In some example embodiments, the autoencoder 250 may be trained to learn which features from the input x are required to generate a reconstruction of the input x that is substantially identical to the input x. In doing so, the autoencoder 250 may identify the z number of condensed features (e.g., $f_1, f_2, \ldots, f_z$), which are resilient to minor variations between two same or similar icons. Otherwise stated, the condensed features extracted from one icon should be substantially the same as the condensed features extracted from another same or similar icon. Thus, processing the icon 200 with the autoencoder 250 may eliminate at least some of the minor variations (e.g., visual anomalies such as blurriness, color shifts, and/or the like) that may be present the icon 200, thereby enabling the icon 200 to be properly assigned to a cluster of icons.

In some example embodiments, the clustering module 140 may be configured to generate, based on the features associated various icons, a plurality of clusters that group icons of files having known classifications. For instance, the clustering module 140 may generate a plurality of clusters that group icons having the same and/or similar chromatic, gradient, and/or condensed features. Moreover, the plurality of clusters may group icons in accordance with the classifications of the corresponding files. For example, the clustering module 140 may generate clusters that group icons associated files that are known to be benign files and/or malware files. That is, the clustering module 140 may generate clusters of icons that are predominantly associated with benign files and/or clusters of icons that are predominantly associated with malware files. Alternately and/or additionally, the clustering module 140 may generate clusters grouping icons associated with files known to be specific types of malware files such as adware, ransomware, bots, bugs, rootkits, spyware, Trojan horses, viruses, worms, and/or the like. It should be appreciated that a cluster of icons may include icons of for benign files, malware files, and/or different types of malware files without departing from the scope of the present disclosure.

According to some example embodiments, the clustering module 140 may generate the plurality of clusters by at least applying one or more density-based clustering techniques such as density-based spatial clustering of applications with noise, hierarchical density-based spatial clustering of applications with noise, and/or the like. Applying the one or more density-based clustering techniques may generate clusters that group same and/or similar icons associated with files having the same and/or similar classification. Moreover, applying the one or more density-based clustering techniques may identify outliers that are too distant from any single cluster to be grouped into a cluster. These outliers may correspond to unusual and/or infrequently encountered icons, which may have features (e.g., chromatic, gradient, and/or condensed features) that render the icons dissimilar to other icons that are grouped into the clusters generated by the clustering module 140. In some implementations of the current subject matter, the clustering module 140 may apply a different clustering technique in addition and/or instead of the density-based clustering techniques. For instance, the clustering module 140 may apply a centroid-based clustering technique, such as k-means clustering and/or the like, to generate additional clusters that group the outlying icons.

Figure 3:
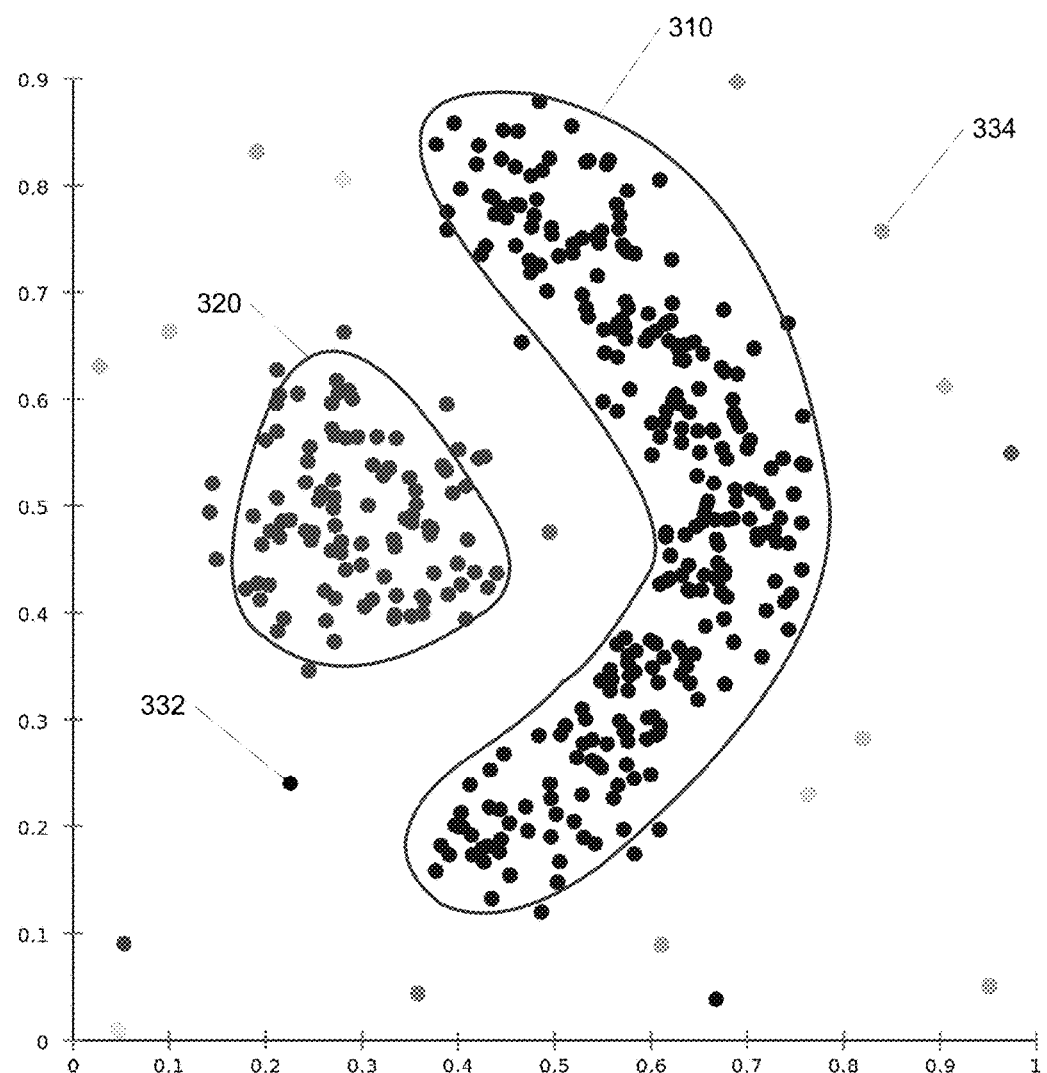
FIG. 3 depicts a clustering of a plurality of icons, in accordance with some example embodiments.

FIG. 3 depicts a clustering of a plurality of icons, in accordance with some example embodiments. As shown in FIG. 3, the clustering module 140 may apply one or more density-based clustering techniques to generate a plurality of clusters including, for example, a first cluster 310 and a second cluster 320. For instance, the first cluster 310 may group icons of files having one classification (e.g., benign file) while the second cluster 320 may group icons of files having a different classification (e.g., malware file and/or specific types of malware file). In addition, applying the one or more density-based clustering techniques may further identify icons that are outliers including, for example, a first outlier 332 and a second outlier 334. The first outlier 332 and the second outlier 334 may correspond to unusual and/or infrequently encountered icons and thus do not belong to the first cluster 310 and the second cluster 320. That is, the first outlier 332 and the second outlier 334 may correspond to icons that are not similar to any of the icons that are grouped into the first cluster 310 and the second cluster 320. In some implementations of the current subject matter, the clustering module 140 may apply a different clustering technique (e.g., a centroid-based clustering technique) to generate clusters that group the outliers such as the first outlier 232 and the second outlier 334.

In some implementations of the current subject matter, the classification module 150 may be configured to classify a file, which may be an unclassified file that is encountered at and/or present on the client device 170. The classification module 150 may classify the file by at least assigning the corresponding icon to one of the plurality of clusters (e.g., generated by the clustering module 140) of icons associated with files having known classifications. According to some example embodiments, the classification module 150 may assign the icon based on various features associated with the icon including, for example, chromatic features (e.g., extracted by the chromatic feature extraction module 110), gradient features (e.g., extracted by the gradient feature extraction module 120), and/or condensed features (e.g., extracted by the condensed feature extraction module 130). Thus, the classification module 150 may assign the icon to a cluster of icons having the same and/or similar features (e.g., chromatic, gradient, and/or condensed features) as the icon.

For instance, the classification module 150 may classify a file as benign if the classification module 150 determines that the icon associated with the file belongs to a cluster for icons of files that are known to be benign. Alternately and/or additionally, the classification module 150 may classify a file as a malware and/or a specific type of malware (e.g., adware, ransomware, bots, bugs, rootkits, spyware, Trojan horses, viruses, worms, and/or the like) if the classification module 150 determines that the icon associated with the file belongs to a cluster for icons of files that are known to be malware and/or a specific type of malware.

According to some example embodiments, the classification module 150 may assign, to a cluster, the icon of a file by at least applying one or more clustering techniques such as a centroid-based clustering technique (e.g., k-nearest neighbor clustering, k-means clustering) and/or the like. A centroid-based clustering technique (e.g., k-nearest neighbor clustering, k-means clustering) may be applied instead of a density-based clustering technique (e.g., density-based spatial clustering of applications with noise, hierarchical density-based spatial clustering of applications with noise) because density-based clustering techniques are unable to identify the existing cluster to which a new icon would be belong. The centroid-based clustering technique may serve as a classifier that emulates the behavior of the density-based clustering technique and predicts the cluster into which the new icon would be clustered using the density-based clustering technique. In some example embodiments, more than one centroid-based clustering technique may be applied when applying one centroid-based clustering technique (e.g., k-nearest neighbor clustering) indicates that an icon is an outlier.

Application of the clustering technique may identify the cluster (e.g., the first cluster 310 or the second cluster 320) into which the clustering module 140 would have grouped the icon of the file (e.g., by applying a density-based clustering technique). Moreover, application of the clustering technique may also indicate whether the clustering module 140 would identify (e.g., by applying a density-based clustering technique) the icon of the file as an outlier (e.g., such as the first outlier 332, the second outlier 334, and/or the like) that does not belong to any of the plurality of clusters generated by the clustering module 140 (e.g., the first cluster 310, the second cluster 320).

In some example embodiments, if applying a first clustering technique to assign an icon to a cluster indicates that the icon is an outlier, the classification module 150 may apply a second clustering technique in order to assign the icon to a cluster. For example, the classification module 150 may apply k-nearest neighbor clustering to identify the cluster into which the clustering module 140 would have grouped the icon of the file. But if applying k-nearest neighbor clustering indicates that the icon is an outlier, the classification module 150 may apply k-means clustering to identify the cluster into which the clustering module 140 would have grouped the icon of the file.

It should be appreciated that the classification module 150 may assign an icon to a cluster by applying different techniques without departing from the scope of the present disclosure. For instance, instead of and/or in addition to clustering techniques, the classification module 150 may apply a machine learning model such as a feed-forward neural network (e.g., convolutional neural network) and/or the like.

In some example embodiments, the user interface module 160 may be configured to generate one or more user interfaces that enable interaction between a user of the client device 170 and the malware classification system 100. For example, the user interface module 160 may generate a graphic user interface (GUI) that enables the user of the client device 170 to input an icon of a file that require classification. Alternately and/or additionally, the user interface module 160 may generate a graphic user interface that displays a result of the icon-based classification performed by the malware classification system 100.

Figure 4:
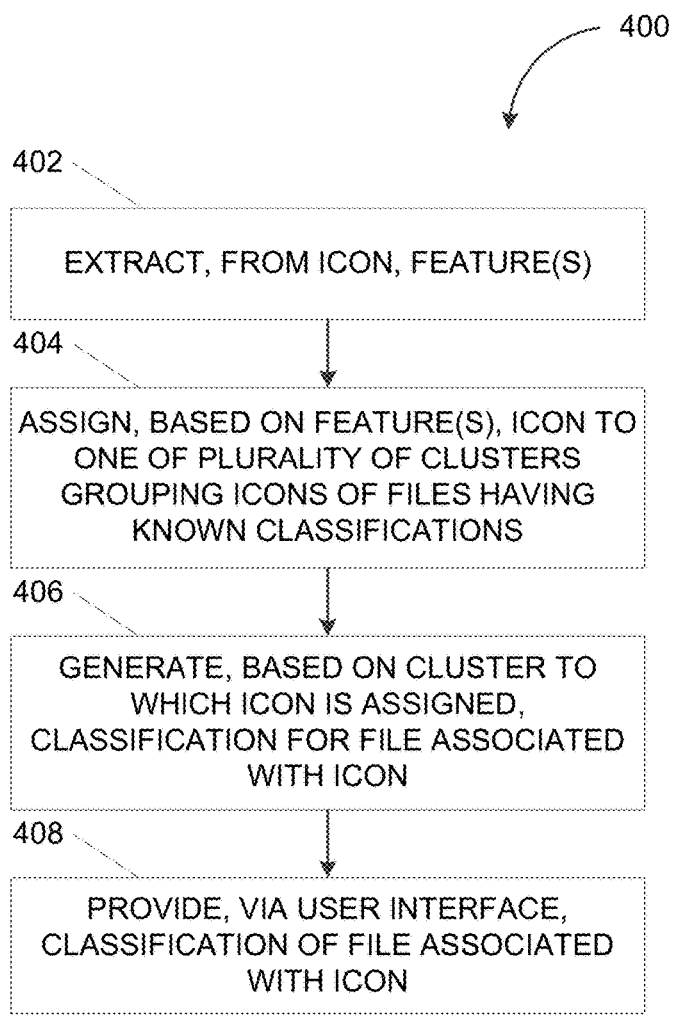
FIG. 4 depicts a flowchart illustrating a process for icon based malware detection, in accordance with some example embodiments.

FIG. 4 depicts a flowchart illustrating a process 400 for icon based malware detection, in accordance with some example embodiments. Referring to FIG. 1-4, the process 400 may be performed by the malware classification system 100.

The malware classification system 100 may extract, from an icon associated with a file, one or more features (402). For instance, the malware classification system 100 (e.g., the chromatic feature extraction module 110, the gradient feature extraction module 120, the condensed feature extraction module 130) may extract, from the icon 200, one or more features including, for example, an x number of chromatic features, a y number of gradient features, and/or z number of condensed features. The chromatic features may capture at least a portion of the color information associated with the icon 200 while the gradient features may capture at least a portion of the shape and/or textural information associated with the icon 200. Meanwhile, the condensed features may correspond to a subset of the features from the icon 200 that may be used to form a compressed version of the icon 200.

The malware classification system 100 may assign, based at least on the one or more features, the icon to one of a plurality of clusters that group icons of files having known classification (404). In some example embodiments, the malware classification system 100 (e.g., the clustering module 140) may have generated, by applying one or more density-based clustering algorithms, a plurality of clusters that group icons of files having known classifications. The malware classification system 100 (e.g., the clustering module 140) may cluster the icons based on the features (e.g., chromatic, gradient, and/or condensed features) associated with each icon. In doing so, each of the plurality of clusters may include icons having the same and/or similar features. For instance, the malware classification system 100 (e.g., the clustering module 140) may have generated the first cluster 310 grouping together icons of benign files and the second cluster 320 grouping together icons of malware files. The first cluster 310 may include icons having the same and/or similar features as one another. Similarly, the second cluster 320 may also include icons having the same and/or similar features as one another.

According to some example embodiments, the malware classification system 100 (e.g., the classification module 150) may determine which one of the clusters (e.g., the first cluster 310 or the second cluster 320) includes icons that are most likely to be grouped together with the icon 200. Thus, the malware classification system 100 (e.g., the classification module 150) may assign the icon 200 to a cluster that includes other icons having the same and/or similar features (e.g., chromatic, gradient, and/or condensed features) as the icon 200.

The malware classification system 100 may generate, based at least on the cluster to which the icon is assigned, a classification for the file associated with the icon (406). For instance, the malware classification system 100 (e.g., the classification module 150) may assign the icon 200 to a cluster (e.g., the first cluster 310) of icons for files that are known to be benign files. As such, the malware classification system 100 (e.g., the classification system 150) may determine that the file associated with the icon 200 is also a benign file. Alternately and/or additionally, the malware classification system 100 may assign the icon 200 to a cluster (e.g., the second cluster 320) of icons for files that are known to be malware files and/or a specific type of malware files (e.g., adware, ransomware, bots, bugs, rootkits, spyware, Trojan horses, viruses, worms, and/or the like). Accordingly, the malware classification system 100 (e.g., the classification system 150) may determine that the file associated with the icon 200 is also a malware file or a specific type of malware file.

The malware classification system 100 may provide, via a user interface, the classification of the file associated with the icon (408). For example, the malware classification system 100 (e.g., the user interface module 160) may generate a user interface (e.g., a graphic user interface) that displays (e.g., at the client device 170) the classification of the file associated with the icon 200.

Figure 5:
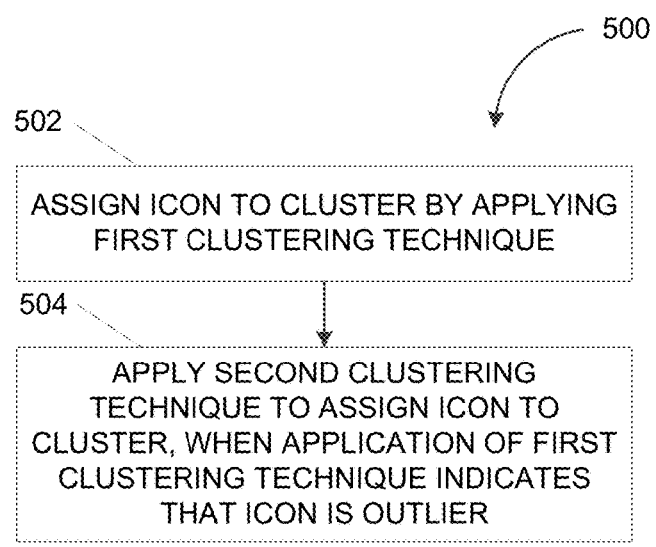
FIG. 5 depicts a flowchart illustrating a process for cluster based classification of an icon, in accordance with some example embodiments.

FIG. 5 depicts a flowchart illustrating a process 500 for cluster based classification of an icon, in accordance with some example embodiments. Referring to FIGS. 1-5, the process 500 may be performed by the malware classification system 100 and may implement operation 404 of the process 400.

The malware classification system 100 may assign an icon to one of a plurality of clusters by at least applying a first clustering technique (502). For example, the malware classification system 100 (e.g., the classification module 150) may assign the icon 200 to one of the plurality of clusters (e.g., the first cluster 310 or the second cluster 320) by applying k-nearest neighbor clustering. Applying k-nearest neighbor clustering may identify which one of the plurality of clusters includes icons that are the most similar (e.g., having the same and/or similar chromatic, gradient, and/or condensed features) to the icon 200. However, the icon 200 may be an unusual and/or infrequently encountered icon having features (e.g., chromatic, gradient, and/or condensed features) that renders the icon 200 dissimilar to the icons found in the existing clusters (e.g., the first cluster 310, the second cluster 320). As such, applying k-nearest neighbor clustering may fail to identify a cluster to which to assign the icon 200, thereby indicating that the icon 200 is an outlier.

The malware classification system 100 may apply a second clustering technique to assign the icon to one of a plurality of clusters, when applying the first clustering algorithm indicates that the icon is an outlier (504). For instance, if applying k-nearest neighbor clustering indicates that the icon 200 is an outlier, the malware classification system 100 (e.g., the classification module 150) may apply k-means clustering. Applying k-means clustering may cluster outliers that include the icon 200, thereby assigning the icon 200 to a cluster.

In some example embodiments, applying k-means clustering to assign the icon 200 may include selecting a cluster that would have a minimal with-in cluster sum of squares when the icon 200 is grouped with the other icons in that cluster. That is, applying k-means clustering includes identifying a cluster to assign the icon 200 such that the objective set forth in the following equation (2) is satisfied.

$$\operatorname{argmin}_S \sum_{i=1}^{k} \sum_{x \in S_i} \|x - u_i\|^2$$

wherein $S_i$ may be a set of clusters $S=\{S_1, S_2, \ldots, S_k\}$ and $u_i$ may be the mean of the distance between various icons and a center point in a corresponding cluster $S_i$.

Implementations of the present disclosure can include, but are not limited to, methods consistent with the descriptions provided above as well as articles that comprise a tangibly embodied machine-readable medium operable to cause one or more machines (e.g., computers, etc.) to result in operations implementing one or more of the described features. Similarly, computer systems are also described that can include one or more processors and one or more memories coupled to the one or more processors. A memory, which can include a computer-readable storage medium, can include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital MRI image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations can be within the scope of the following claim.

What is claimed is:

1. A system, comprising:
at least one processor; and
at least one memory including program code which when executed by the at least one processor provides operations comprising:
extracting, from an icon associated with a file, a plurality of features, wherein the icon includes a plurality of pixels, and wherein each of the plurality of pixels is associated with a pixel value corresponding to a numerical representation of an intensity of the pixel, the extracting comprising each of (i) extracting one or more chromatic features corresponding to a distribution of pixel values for the plurality of pixels included in the icon, (ii) extracting one or more gradient features corresponding to a gradient and/or edge orientation of the plurality of pixels in the icon, and wherein the gradient and/or edge orientation of the plurality of pixels correspond to a direction of change in pixel values, and (iii) extracting one or more condensed features, the one or more condensed features comprising one or more features required to generate a reconstruction of the icon that is representative of the icon;
assigning, based at least on the plurality of features, the icon to one of a plurality of clusters, the plurality of clusters including a first cluster and a second cluster, the first cluster including icons of one or more files that are known to be benign files and the second cluster including icons of one or more files that are known to be malware files;
generating, based at least on the cluster to which the icon is assigned, a classification for the file associated with the icon; and
preventing the file from being accessed or executed if the file is classified as being malware.

2. The system of claim 1, wherein the plurality of clusters include a third cluster that includes icons of one or more files that are known to be a second type of malware file.

3. The system of claim 1, wherein the plurality of clusters are generated by at least applying a density-based clustering technique, and wherein the applying of the density-based clustering technique groups icons having same and/or similar features.

4. The system of claim 3, wherein the applying of the density-based clustering technique further identifies at least one outlier that is not grouped with any cluster from the plurality of clusters, and wherein the at least one outlier corresponds to an icon having features that renders the icon dissimilar to the icons that are grouped together into the plurality of clusters.

5. The system of claim 3, wherein the assigning of the icon to the one of the plurality of clusters comprises: applying a first clustering technique to assign the icon to the one of the plurality of clusters; and applying a second clustering technique to assign the icon to the one of the plurality of clusters, when applying the first clustering technique indicates that the icon is an outlier.

6. A computer-implemented method, comprising:
extracting, from an icon associated with a file, a plurality of features, wherein the icon includes a plurality of pixels, and wherein each of the plurality of pixels is associated with a pixel value corresponding to a numerical representation of an intensity of the pixel, the extracting comprising each of (i) extracting one or more chromatic features corresponding to a distribution of pixel values for the plurality of pixels included in the icon, (ii) extracting one or more gradient features corresponding to a gradient and/or edge orientation of the plurality of pixels in the icon, and wherein the gradient and/or edge orientation of the plurality of pixels correspond to a direction of change in pixel values, and (iii) extracting one or more condensed features, the one or more condensed features comprising one or more features required to generate a reconstruction of the icon that is representative of the icon;
assigning, based at least on the plurality of features, the icon to one of a plurality of clusters, the plurality of clusters including a first cluster and a second cluster, the first cluster including icons of one or more files that are known to be benign files and the second cluster including icons of one or more files that are known to be malware files;
generating, based at least on the cluster to which the icon is assigned, a classification for the file associated with the icon; and
preventing the file from being accessed or executed if the file is classified as being malware.

7. The computer-implemented method of claim 6, wherein the plurality of clusters include a third that includes icons of one or more files that are known to be a second type of malware file.

8. The computer-implemented method of claim 6, wherein the plurality of clusters are generated by at least applying a density-based clustering technique, and wherein the applying of the density-based clustering technique groups icons having same and/or similar features.

9. The computer-implemented method of claim 8, wherein the assigning of the icon to the one of the plurality of clusters comprises: applying a first clustering technique to assign the icon to the one of the plurality of clusters; and applying a second clustering technique to assign the icon to the one of the plurality of clusters, when applying the first clustering technique indicates that the icon is an outlier.

10. The method of claim 6, wherein the one or more gradient features are extracted by a least generating one or more histograms of oriented gradients for the icon and/or one or more portions of the icon.

11. The method of claim 6, wherein the one or more condensed features are extracted by at least processing the icon with a machine learning model.

12. The method of claim 11, wherein the machine learning model comprises an autoencoder trained to identify, based at least on a respective pixel value of the plurality of pixels, the one or more features required to generate the reconstruction of the icon.

13. The method of claim 6, wherein the first clustering technique comprises k-nearest neighbor clustering, and wherein the second clustering technique comprises k-means clustering technique.

14. A non-transitory computer-readable storage medium including program code which when executed by at least one processor causes operations comprising:
extracting, from an icon associated with a file and using an autoencoder, one or more condensed features, wherein the autoencoder comprises a machine learning model trained to generate a compressed version of the icon so as to identify the plurality of extracted features, the extracting comprising each of (i) extracting one or more chromatic features corresponding to a distribution of pixel values for the plurality of pixels included in the icon, (ii) extracting one or more gradient features corresponding to a gradient and/or edge orientation of the plurality of pixels in the icon, and wherein the gradient and/or edge orientation of the plurality of pixels correspond to a direction of change in pixel values, and (iii) extracting one or more condensed features, the one or more condensed features comprising one or more features required to generate a reconstruction of the icon that is representative of the icon;

assigning, based at least on the one or more features, the icon to one of a plurality of clusters, the plurality of clusters including a first cluster and a second cluster, the first cluster including icons of one or more files that are known to be benign files and the second cluster including icons of one or more files that are known to be malware files;

generating, based at least on the cluster to which the icon is assigned, a classification for the file associated with the icon as either being malware or benign; and preventing the file from being accessed or executed if the file is classified as malware.

15. The computer readable medium of claim 14, wherein the plurality of clusters include a third cluster that includes icons of one or more files that are known to be a second type of malware file.

16. The computer readable medium of claim 14, wherein the plurality of clusters are generated by at least applying a density-based clustering technique, and wherein the applying of the density-based clustering technique groups icons having same and/or similar features.

17. The computer readable medium of claim 16, wherein the applying of the density-based clustering technique further identifies at least one outlier that is not grouped with any cluster from the plurality of clusters, and wherein the at least one outlier corresponds to an icon having features that renders the icon dissimilar to the icons that are grouped together into the plurality of clusters.

18. The computer readable medium of claim 16, wherein the assigning of the icon to the one of the plurality of clusters comprises: applying a first clustering technique to assign the icon to the one of the plurality of clusters; and applying a second clustering technique to assign the icon to the one of the plurality of clusters, when applying the first clustering technique indicates that the icon is an outlier.

19. The method of claim 18, wherein the first clustering technique and/or the second clustering technique comprise a classifier that is trained to determine the one of the plurality of clusters to which the icon would be assigned by applying the density-based clustering technique.

* * * * *